(12) United States Patent
Saitawdekar et al.

(10) Patent No.: US 9,871,913 B1
(45) Date of Patent: *Jan. 16, 2018

(54) SYSTEMS AND METHODS TO IDENTIFY ANI AND CALLER ID MANIPULATION FOR DETERMINING TRUSTWORTHINESS OF INCOMING CALLING PARTY AND BILLING NUMBER INFORMATION

(71) Applicant: TrustID, Inc., Lake Oswego, OR (US)

(72) Inventors: Shreyas Dattatraya Saitawdekar, Portland, OR (US); Patrick Michael Cox, Newberg, OR (US); Daniel Vincent Stone, Portland, OR (US); Dean Franklin Black, Vancouver, WA (US); Richard J. Green, Portland, OR (US)

(73) Assignee: TrustID, Inc., Lake Oswego, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/045,020

(22) Filed: Feb. 16, 2016

Related U.S. Application Data

(63) Continuation of application No. 13/355,135, filed on Jan. 20, 2012, now Pat. No. 9,264,536.

(51) Int. Cl.
*H04M 3/42* (2006.01)
*H04M 3/436* (2006.01)

(52) U.S. Cl.
CPC ....... *H04M 3/42059* (2013.01); *H04M 3/436* (2013.01); *H04M 2203/6045* (2013.01)

(58) Field of Classification Search
CPC .............. H04M 3/42059; H04M 3/436; H04M 2203/6045; H04M 1/66; H04M 3/42068
See application file for complete search history.

(56) References Cited

U.S. PATENT DOCUMENTS

| 4,754,475 | A | 6/1988 | Pintos et al. |
| 4,796,292 | A | 1/1989 | Thomas |
| 5,699,416 | A | 12/1997 | Atkins |
| 5,963,625 | A | 10/1999 | Kawecki et al. |

(Continued)

OTHER PUBLICATIONS

Saitawdekar et al., U.S. Appl. No. 13/355,135, filed Jan. 20, 2012, Office Action Communication, dated Dec. 20, 2012, 18 pages.

(Continued)

*Primary Examiner* — Sonia Gay
(74) *Attorney, Agent, or Firm* — Sterne, Kessler, Goldstein & Fox, P.L.L.C.

(57) ABSTRACT

Systems and methods for determining the trustworthiness of calling party information, such as caller ID and ANI information, contained in a call request are provided. The method includes receiving a call request at a service provider network element, such as a telecommunication carrier switch. A decision is made as to whether the call request should be verified by reviewing a database of called telephone numbers for monitoring. When the call request is to be verified, a determination is made whether a discrepancy exists between the calling party information contained within the call request and authenticated stored calling party information. For example, the caller ID information in a call request is compared to service provider caller ID information for the calling party to determine if they match. When a discrepancy exists, a discrepancy report is transmitted to the called party.

20 Claims, 4 Drawing Sheets

(56) References Cited

U.S. PATENT DOCUMENTS

| | | |
|---|---|---|
| 6,307,926 B1 | 10/2001 | Barton et al. |
| 6,373,930 B1 | 4/2002 | McConnell et al. |
| 6,947,532 B1 | 9/2005 | Marchand et al. |
| 7,043,241 B1 | 5/2006 | Sladek et al. |
| 7,912,192 B2 | 3/2011 | Kealy et al. |
| 8,238,532 B1 | 8/2012 | Cox et al. |
| 8,254,541 B2 | 8/2012 | Cai |
| 2007/0121851 A1 | 5/2007 | Maropis et al. |
| 2007/0127658 A1 | 6/2007 | Gruchala et al. |
| 2007/0201660 A1 | 8/2007 | Lan et al. |
| 2007/0271339 A1 | 11/2007 | Katz |
| 2010/0166160 A1 | 7/2010 | Moss et al. |

OTHER PUBLICATIONS

Saitawdekar et al., U.S. Appl. No. 13/355,135, filed Jan. 20, 2012, Office Action Communication, dated Sep. 26, 2013, 16 pages.
Saitawdekar et al., U.S. Appl. No. 13/355,135, filed Jan. 20, 2012, Office Action Communication, dated Aug. 5, 2014, 14 pages.
Saitawdekar et al., U.S. Appl. No. 13/355,135, filed Jan. 20, 2012, Office Action Communication, dated Feb. 23, 2015 pages.
Saitawdekar et al., U.S. Appl. No. 13/355,135, filed Jan. 20, 2012, Notice of Allowance Communication, dated Oct. 6, 2015, 8 pages.

SYSTEMS AND METHODS TO IDENTIFY ANI AND CALLER ID MANIPULATION FOR DETERMINING TRUSTWORTHINESS OF INCOMING CALLING PARTY AND BILLING NUMBER INFORMATION

CROSS-REFERENCE TO RELATED APPLICATIONS

This application is a continuation of U.S. patent application Ser. No. 13/355,135, filed Jan. 20, 2012 (now U.S. Pat. No. 9,264,536), which is hereby incorporated by reference in its entirety.

BACKGROUND OF THE INVENTION

Copyright Notice

© 2011 TrustID, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

Field of the Invention

The present invention relates generally to calls placed in telecommunication and information service networks and, in particular, to establishing the credibility of incoming calls by identifying and reporting on the credibility of Automatic Number Identification (ANI) information and caller ID information.

BACKGROUND ART

Automatic Number Identification (ANI) in North America is information identifying the 10-digit billing telephone number of a caller provided to the recipient of the call. ANI was made available in 1967 to business telephone customers who purchased toll free circuits (800 or "Inward-WATS") to inform a business telephone customer who was calling, because the called business was paying the toll costs of the incoming call. ANI and Calling Number Identification (Caller ID) were made available as products to residential and small business telephone customers to provide them with the 10-digit telephone number of the calling party. Additionally, by the late 1980s calling name services were also made available in which a caller's name would be also delivered to a called party. Businesses such as banks, call centers, and government entities, such as 911 service centers have relied on ANI information as a factor in identity determination and as an element in location discovery. ANI information is also used for call routing assistance, workflow efficiency, and fraud mitigation.

The ability to control or manipulate ANI and caller ID information has been available for over a decade. Historically, only sophisticated and mostly regulated telecommunications carriers and very large business users, who subscribed to expensive multi-line Primary Rate Interface (PRI) telephone circuits had the ability to manipulate ANI. ANI control has legitimate uses. As an example, a large business uses ANI control to display its main telephone number on all outgoing calls from its multiple lines, rather than each of the individual lines.

The ability to falsify ANI and caller ID information stems from interaction of new technologies with legacy telecommunications architecture. Before the advent of information services network (e.g., Internet) telephony and deregulation, the telecommunications network was a closed system with one or both of a limited number of trusted FCC- and Public Utility Commission-licensed telecommunications companies adhering to a finite set of standards. Telecommunications decentralization and deregulation, as well as Internet telephony (e.g., Voice over Internet Protocol (VoW) technology), have exposed this legacy architecture to an abundance of new telephony products and services that inject calls and calling data from outside the control of the legacy telecommunications network. The telephony network then delivers to its destinations these calls and associated information, in most cases, without checking their validity. Consequently, this system supplies an opening for criminals to easily place calls with fabricated or "spoofed" ANIs for nefarious purposes. ANI fabrication or spoofing is a low cost, powerful penetration tool used to impersonate identity and location. Multiple companies and, more importantly, technologies exist for the sole purpose of enabling anyone, anywhere, to spoof ANI and Caller ID for pennies each call.

Throughout the past 25 years, telecommunication users have relied on ANI and have built vital business processes around the incoming calling party telephone number. In addition, most businesses have developed sophisticated inbound telephone answering systems (known as, for example, integrated voice response ("IVR") systems) that answer calls and are programmed with rules-based decision parameters grounded on the ANI information. Relying on non-validated ANI information undermines these critical marketing, technical, and security processes used for authentication, identity, location, customer service and activation in today's financial services, general business, and government enterprises. As one specific industry example, major financial institutions now have compromised critical operations that were built upon the trustworthiness of ANI. Applications such as bank-card activation, credit issuance, money transfers, new account applications, and customer service have all relied on the layer of security ANI has provided. Decisions made using the current non-validated ANI place an enterprise at risk of diminished revenue by limiting new product offerings and increased losses from fraud. Attempted fraud is estimated to exceed $50 billion each year in the U.S. alone. Identity fraud is a key driver in these losses. Today, bank card activation fraud occurs by telephone as frequently as other remote banking channels (i.e., not face-to-face), such as ATM, email, and world wide web.

There are several ways in which a motivated individual can take advantage of the current state of the art to manipulate ANI. VoiceXML applications let users change ANI and Caller ID information. An open source PBX software application, such as Asterisk, allows users to manipulate ANI information. Competitive service providers and telecommunication carriers can set their own ANI information. Moreover, certain companies exist today for the sole purpose of allowing ANI and Caller ID to be spoofed and falsified. Businesses such as PhoneGangster, Telespoof, CovertCall, and dozens of others offer widely available ANI and Caller ID spoofing for pennies each call.

The consequences of prevalent, facile manipulation of ANI and caller ID information provide motivation to restore integrity to the use of ANI and caller ID. One major consequence of falsified ANI and caller ID information is financial fraud, which is on the rise and is driven primarily by identity fraud. Traditional financial services customer verification tools such as information-based authentication are being compromised. Most financial service companies use ANI as the apex identifier in their telephonic decision-making. If false trust is placed in spoofed ANI, downstream decisions are compromised. Decisions made using current non-validated ANI is placing companies at risk, limiting new product offerings, and increasing losses from fraud. The disclosed approach restores the value of ANI and thereby helps to reestablish the security of telephone transactions.

There are as many financial transactions conducted over the telephone as are conducted on the world wide web, even in today's Internet pervasive environment. Of the more than nine billion telephone calls placed annually to U.S. financial institutions alone, nearly all rely on ANI for security, location information, call routing, and identity authentication. Knowing the caller's location or that the caller is in possession of an actual telephonic device is the foundation and an important factor for trusted telephone commerce.

The industry and legislators have grappled for many years to combat ANI and caller ID spoofing. In 2003, VoiceXML applications let users change ANI, and, at the same time, VoIP telephony entered the marketplace. An open source PBX software application, called Asterisk, allows users to manipulate calling party number information. Asterisk is a software implementation of a telephone private branch exchange (PBX) originally created in 1999 by Mark Spencer of Digium. As an example, if the ANI field is left blank by the Asterisk or carrier switch, any user can easily manipulate the Caller ID information using Asterisk, thereby populating the ANI field with the same misinformation as the spoofed Caller ID. Asterisk allows users to send spoofed ANI in the same way that businesses had been setting their ANI with PRI lines.

In 2004, a new ANI spoofing service, named Star38, (using VoIP and Asterisk) was launched and gained attention from worldwide mainstream media after USA Today published in its daily paper a front-page article about the service. The same year, others followed such as Camophone, Telespoof, and CovertCall. Over the next year, a dozen additional services started delivering ANI spoofing services.

By 2006, the FCC began investigations into these services, and the House of Representatives and the Senate considered several bills attempting to outlaw use of ANI spoofing for fraudulent purposes. ANI spoofing gained the attention of the mainstream media as SpoofCard announced the cancellation of an account belonging to Paris Hilton that was used to break into the voicemail of Lindsay Lohan to harass her.

On Jun. 27, 2007, the United States Senate Committee on Commerce, Science and Transportation approved and submitted to the Senate calendar Senate Bill 5.704, which would have made spoofing ANI a crime. Titled the "Truth in Caller ID Act of 2007," the bill would have outlawed causing "any caller identification service to transmit misleading or inaccurate caller identification information" via "any telecommunications service or IP-enabled voice service." Law enforcement would have been exempted from the rule. A similar bill, HR251, was recently introduced and passed in the House of Representatives. It had been referred to the same Senate committee that approved 5.704. The bill never became law because the full Senate never voted on it; it was added to the Senate Legislative Calendar under General Orders, but no vote was taken, and the bill expired at the end of the 110th Congress. On Jan. 7, 2009, Senator Bill Nelson (FL) and three co sponsors reintroduced the bill as S.30, the Truth in Caller ID Act of 2009, which was the bill referred to the same committee in the Senate. On Dec. 22, 2010, President Obama signed into law the Truth in Caller ID Act of 2009, which makes it unlawful for a person to transmit misleading or inaccurate caller ID information with an intent to defraud, it amends the Communications Act of 1934. Several of the States have passed bills making misleading Caller ID spoofing illegal.

What is needed are systems and methods to identify ANI and caller ID manipulation for determining trustworthiness of incoming calling party and billing number information.

BRIEF SUMMARY OF THE INVENTION

In an embodiment of the present invention, systems and methods for determining the trustworthiness of calling party information, such as caller ID and ANI information, contained in a call request are provided. In an embodiment, the method includes receiving a call request at a service provider network element, such as a telecommunication carrier switch. The call request includes, at least, a called telephone number and calling party information. A decision is made as to whether the call request should be verified by reviewing a database of called telephone numbers for monitoring. When the call request is to be verified, a determination is made whether a discrepancy exists between the calling party information contained within the call request and authenticated stored calling party information. For example, the caller ID information in a call request is compared to service provider caller ID information for the calling party to determine if they match. When a discrepancy exists, a discrepancy report is transmitted to the called party contained in the call request or its agent to alert them of a potential problem in the trustworthiness of the call information that they will receive through normal call processing of the call request.

Further embodiments, features, and advantages of the invention, as well as the structure and operation of the various embodiments of the invention are described in detail below with reference to accompanying drawings.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

Figure 1:
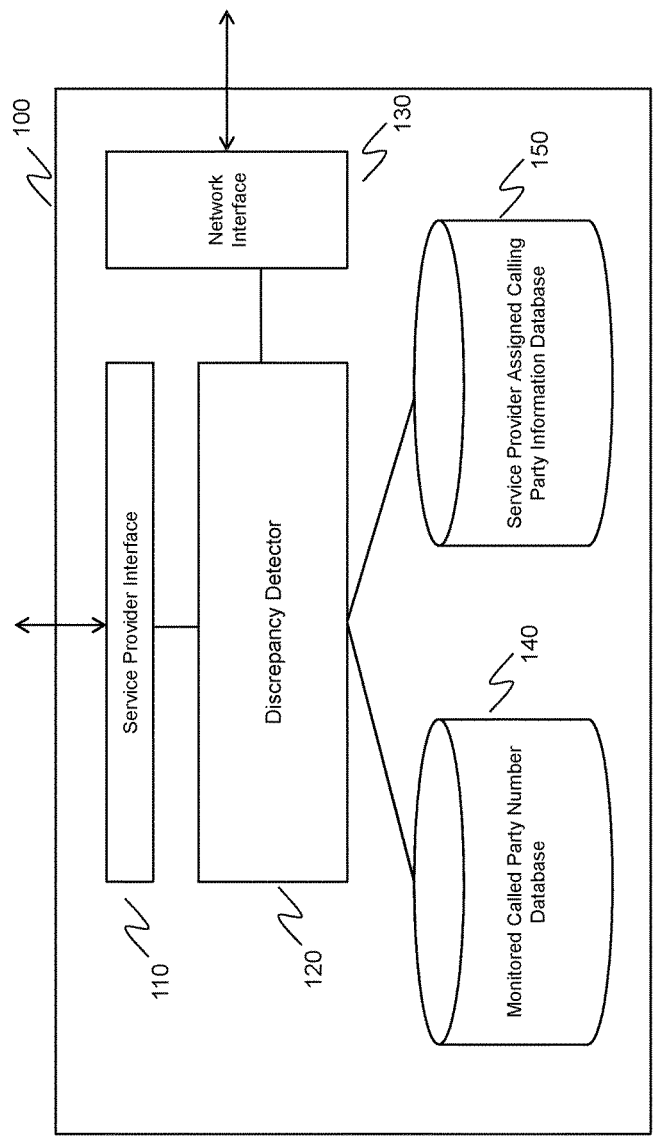
FIG. 1 is a diagram of calling party information verification system, according to an embodiment of the invention.

The present invention will now be described with reference to the accompanying drawings. In the drawings, like reference numbers can indicate identical or functionally similar elements. Additionally, the left-most digit(s) of a reference number may identify the drawing in which the reference number first appears.

DETAILED DESCRIPTION OF THE INVENTION

As discussed above spoofing or falsifying of ANI or caller ID information has potentially significant negative impacts to various types of services, such as credit card activations, that rely on the authenticity of ANI and caller ID information. The present invention addresses the problems highlighted above, by providing systems and methods of identifying and reporting discrepancies to calling party information, such as ANI and caller ID information.

When discrepancies exist, the discrepancies are reported to the called party, an agent of the called party or another third party for consideration and analysis to help identify and potentially reduce fraudulent activities. In particular, ANI and Caller ID discrepancy reporting can assist in the determination of the trustworthiness and credibility of calling party number identification. Embodiments of the invention entail the use of real time telephone switch signaling messages, network data, stored data of switch telephone numbers and Direct Inbound Dialing (DID) numbers (also referred to as extensions) and lists of phone numbers monitored for discrepancy detection and reporting. In embodiments, practice of the disclosed methods is neither detectable by caller nor by called party. Embodiments of the invention can be implemented within existing telecommunication infrastructure. Importantly, in embodiments of the invention, given various privacy concerns and Federal Communications Commission rules, customer proprietary network information (CPNI) is not made available to third parties. In these embodiments, the discrepancy reports received by the called party, third party agent, or any other party do not include the originating number or any other CPNI information. In embodiments, where authorized (e.g., by a police or FBI warrant) discrepancy reports include CPNI information.

FIG. 1 provides a diagram of calling party information verification system 100 according to an embodiment of the invention. Calling party verification system 100 includes service provider interface 110, discrepancy detector 120, network interface 130, monitored called party number database 140, and service provider assigned calling party information database 150. In an embodiment, the operation of calling party verification system 100 is not detectable by the calling party or the called party, as shown in FIG. 2.

Figure 2:
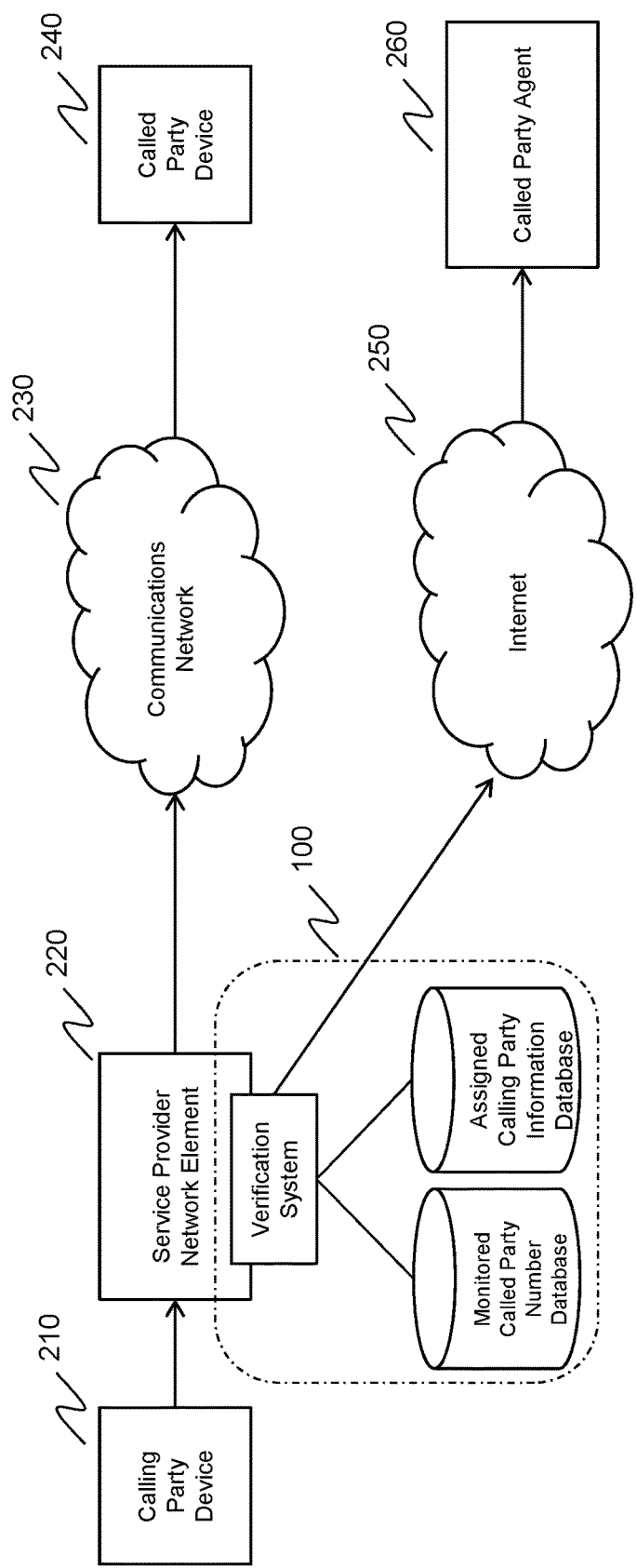
FIG. 2 is a simplified network diagram providing an exemplary illustration of calling party information verification system interfaced with a telecommunications network, according to an embodiment of the invention.

FIG. 2 provides a simplified network diagram providing an exemplary illustration of calling party information verification system 100 interfaced with a telecommunications network, according to an embodiment of the invention. The description of calling party verification system 100 is provided relative to the simplified network diagram for illustration purposes only, and is not intended to limit the scope of the invention to the simplified network. The simplified network diagram portion of FIG. 2, provides calling party device 210, service provider network element 220, communication network 230, and called party device 240. Calling party device 210 and called party device 240 can be any type of device used to place or receive a telephone call, such as, but not limited to an analog telephone, a digital telephone, a wireless telephone, a computer telephony device, a VOIP-based telephone, or a private branch exchange (PBX) supporting multiple lines or key system supporting multiple lines. Service provider network element 220 includes, but is not limited to, analog switches (e.g., 1AESS), digital switches (e.g., 5ESS), IP network switches, and IP network routers. Communications network 230 includes, but is not limited to wireline and wireless networks, traditional plain old telephone service (POTS) networks, IP-based networks and any combination of these types of networks.

Calling party device 210 transmits a call request containing calling party information, as well as called party information (e.g., the telephone number of called party device 240). Upon receipt of the call request, service provider network element 220 processes the call and provides further signaling to communications network 230 in order to complete the call to called party device 240. Calling party verification system 100 is interfaced with service provider network element 220 to verify the calling party information contained within the call request.

Calling party verification system 100 may be interfaced to service provider network element in a variety of ways. Aspects of calling party verification system 100 may be integrated within the software of service provider network element 220 or calling party verification system 100 may be coupled to service provider network element 220 as an adjunct to the element. Further, as shown in FIG. 2, calling party verification system 100 is coupled to Internet 250, which in turn is coupled to called party agent 260. In embodiments Internet 250 may alternatively be a virtual private network, private network or other form of computer network that supports transmission of messages from calling party verification system 100 to called party agent 260.

Referring to FIG. 1, service provider interface 110 is configured to receive call request information from a service provider network element, such as service provider network element 220, which receives a call request having calling party information to a called telephone number. For example, calling party device 210 generates a call request. The call request includes calling party information about calling party device 210 and includes called party information about called party device 240 that is used to route the call properly. In an embodiment, service provider interface 110 also provides a pathway between discrepancy detector 120 and service provider network element to enable discrepancy detector 120 to log the discrepancy, and/or to halt call processing of a call associated with a call request that generates a discrepancy.

In embodiments, calling party information is ANI information, caller ID information or both. Additionally, the call request can be received using various network protocols, including, but not limited to Session Initiation Protocol (SIP), Integrated Services Digital Network (ISDN), Plain Old Telephone Service (POTS), Time Division Mulitplexing (TDM) or Voice over Internet Protocol (VOIP) call messaging protocols.

Discrepancy detector 120 is coupled to service provider interface 210, and is configured to determine whether a discrepancy exists between the calling party information contained within the call request and stored calling party information. Specifically, discrepancy detector 120 is configured to determine whether the call request to the called telephone number is to be verified and determine whether a discrepancy exists between calling party information contained within the call request and stored calling party information when the call request is to be verified. In an embodiment, in order to determine whether a call request is to be verified, discrepancy detector will access monitored called party number database 140. If the called party number matches a number in the monitored called party number database, discrepancy detector 120 will verify the calling party information in the call request.

Discrepancy detector 120 generates a discrepancy report when a discrepancy exists between calling party information contained within the call request and stored calling party information. In an embodiment, a discrepancy exists when the calling party information in the received call request does not match calling party information stored within service provider assigned calling party information database 150 for the calling party. For example, if the ANI or caller ID information in the call request does not match the ANI or caller ID information that is stored in service provider assigned calling party information database 150, a discrepancy is generated.

In another embodiment, discrepancy detector 120 initiates a look-up in an external database other than service provider assigned calling party information database 150 to support discrepancy analysis. For example, discrepancy detector 120 launches a query to a local number portability database to determine what service provider is assigned the ANI and/or caller ID information within the call request. If the service provider is a carrier, other than the carrier maintaining service provider network element 220, then a discrepancy is determined to exist. In an alternative embodiment, called party agent 260 upon receipt of a discrepancy report can conduct additional analysis of the discrepancy report, including, but not limited to, querying a local number portability database to determine what service provider is assigned the ANI and/or caller ID information within the call request.

Discrepancy detector 120 captures call parameters associated with the call request, when a discrepancy exists. Call parameters include one or more of an identity of the service provider receiving the call request, the caller ID and/or ANI information, the called party number, a type of discrepancy event, a date of the call request, and/or a time of the call request, preferably in GMT. As an example, a type of discrepancy event is that caller ID information in the call request did not match caller ID information in service provider assigned calling party information database 150.

Network interface 130 is coupled to discrepancy detector 120, and transmits discrepancy reports. Network interface 130 transmits the discrepancy reports to the called party or an agent for the called party, such as called party agent 260. Network interface 130 also can transmit a discrepancy report prior to further processing of a call requested in the call request, transmit the discrepancy report during processing of a call requested in the call request and before call completion to the called party, or transmit the discrepancy report after call completion to the called party. If the discrepancy report is transmitted after call completion, the report can be transmitted either individually or in a batch transmission with other discrepancy reports.

Monitored called party number database 140 is coupled to the discrepancy detector, and contains telephone numbers for called party numbers for which call request validity is to be assessed. In an embodiment, monitored called party number database 140 can be populated with toll free numbers and non-toll free numbers associated with a financial institutions credit card verification services. In another embodiment, called party number database 140 can be configured with an NPA-NXX, such that any individual number within that NPA-NXX block of telephone numbers will be monitored.

Service provider assigned calling party information database 150 is coupled to discrepancy detector 150, and contains service provider assigned calling party information. Information, for example, may include mappings of caller ID and ANI information to the lines (e.g., POTS lines or VOIP extensions) upon which a call request is received.

Figure 3:
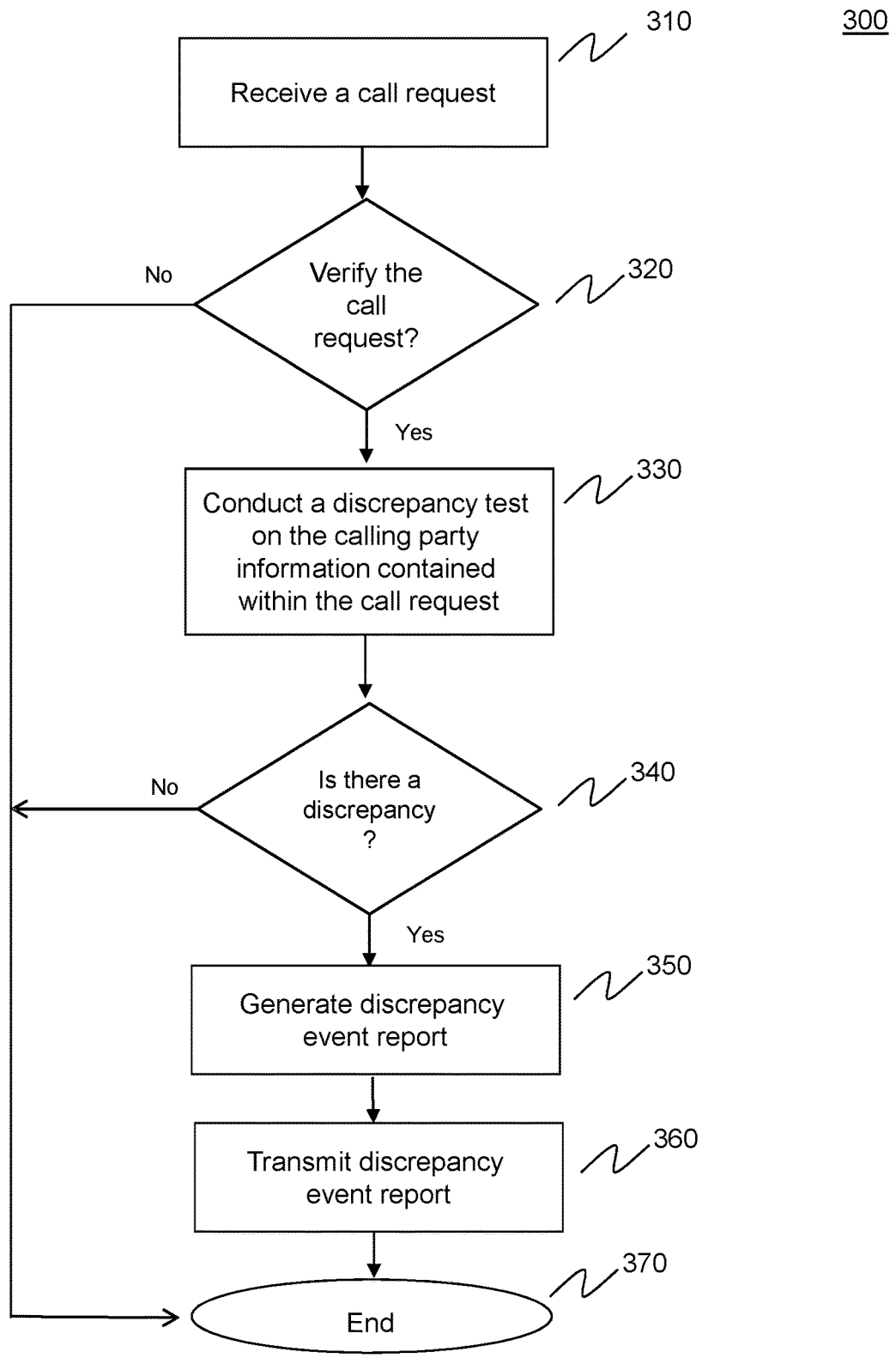
FIG. 3 provides a flow chart of a method to verify a call request, according to an embodiment of the invention.

FIG. 3 provides method 300 for verify a call request, according to an embodiment of the invention. In embodiments, method 300 is not detectable by the calling party, the called party, or both. Method 300 begins in step 310. In step 310 a call request is received. The call request includes at least a called telephone number and calling party information. The calling party information can include, but is not limited to ANI information and/or caller ID information. Referring to FIG. 2, for example, service provider network element 220 receives a call request, which is then received by discrepancy detector 120 via service provider interface 110. In embodiments, the calling party information in the call request includes the ANI information of calling party device 210. Alternatively, the calling party information in the call request includes caller ID information of calling party device 210. And finally in another embodiment, the calling party information includes both the caller ID information and the ANI information of calling party device 210. The call request will also include the telephone number of the called party, such as the telephone number of called party device 240.

In step 320 a decision is made whether to verify the call request. When a call request is received, for example, discrepancy detector 120 compares the calling party number in the call request to telephone numbers stored in monitored called party number database 140. If the calling party number in the call request matches a stored telephone number then the call request will be verified. Otherwise, the call request is not verified and method 300 proceeds to step 370 and ends. In this case, call processing proceeds as normal to complete the call to the called party. When a decision to verify the call request is made, method 300 proceeds to step 330.

In step 330, a discrepancy test on the calling party information contained in the call request is conducted. A variety of discrepancy tests can be conducted. In an embodiment, a discrepancy exists when calling party information received in a call request does not match stored calling party information assigned by a service provider receiving the call request, such as telephone number information stored in service provider assigned calling party information database 150. For example, if the ANI information in the call request does not match ANI information for the calling party stored in service provider assigned calling party information database, then a discrepancy is determined to exist. In another example, if the caller ID information in the call request does not match caller ID information for the calling party stored in service provider assigned calling party information database, then a discrepancy is determined to exist In step 340 a determination is made whether a discrepancy exists. If no discrepancy exists, method 300 proceeds to step 370 and call processing proceeds as normal to complete the call to the called party. If a discrepancy exists, method 340 proceeds to step 350.

In step 350 a discrepancy report is generated. When a discrepancy report is generated, discrepancy detector 120 captures call parameters from the call request including one or more of an identity of the service provider receiving the call request, the called party number, the ANI and/or caller ID information of the call request, a type of discrepancy event, a date of the call request, and/or a time of the call request. These call parameters are added to the discrepancy report.

In step 360 the discrepancy report is transmitted. In embodiments, the discrepancy report is transmitted to the called party, an agent for the called party or another third party. In embodiments, transmitting the discrepancy report occurs prior to further processing of a call requested in the call request, during processing of a call requested in the call request and before call completion to the called party, or occurs after call completion to the called party. When the discrepancy report is transmitted after call completion, the discrepancy report is transmitted either individually or in a batch transmission with other discrepancy reports. The discrepancy report is transmitted via the Internet, virtual private network, or other type of network. In an optional step, when a discrepancy is detected, call processing of the call requested can be suspended or terminated, or the discrepancy event can be logged. For example, discrepancy detector 120 can cause a signal to be transmitted to service provider network element 220 to halt call processing.

In step 370 method 300 ends.

Computer System Implementation

Figure 4:
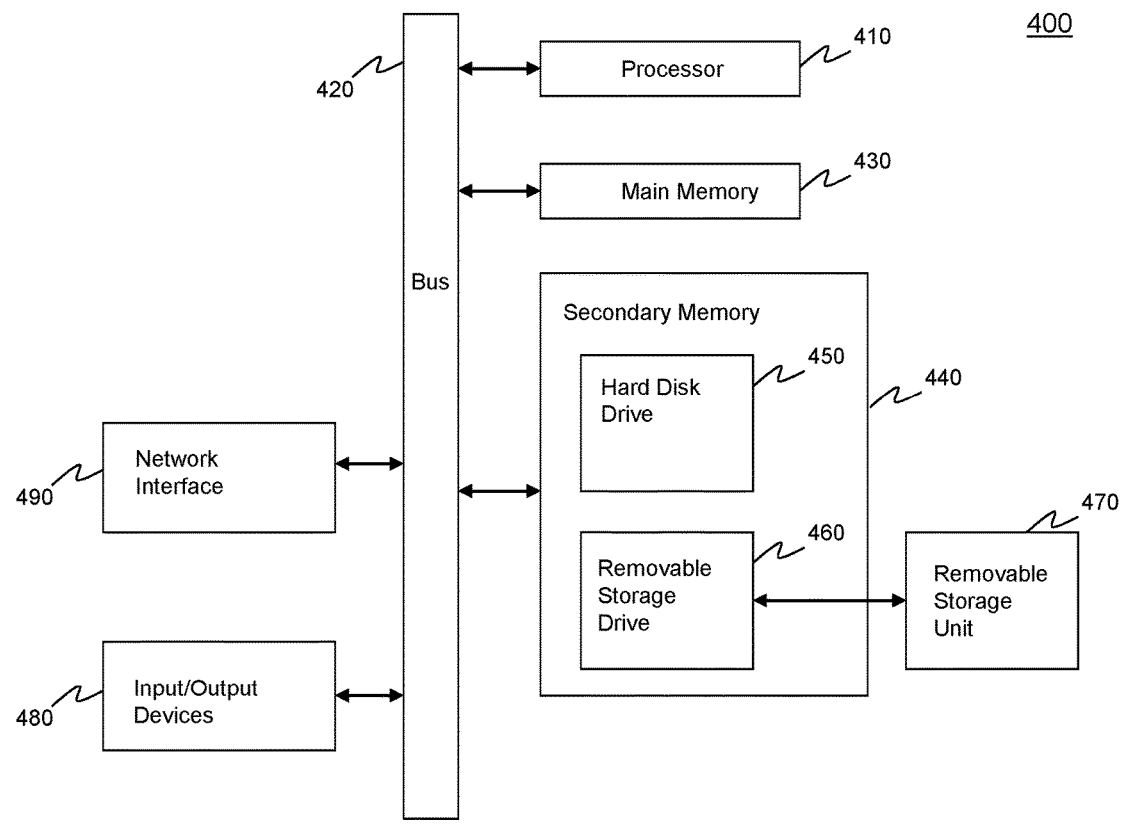
FIG. 4 is a diagram of a computer system on which the methods and systems herein described can be implemented, according to an embodiment of the invention.

Calling party verification system 100 can be implemented in hardware, software or a combination thereof. To the extent that software is used that software can be implemented and supported on a computer system, such as computer system 400, as illustrated in FIG. 4. Computer 400 includes one or more processors (also called central processing units, or CPUs), such as processor 410. Processor 410 is connected to communication bus 420. Computer 400 also includes a main or primary memory 430, preferably random access memory (RAM). Primary memory 430 has stored therein control logic (computer software), and data.

Computer 400 may also include one or more secondary storage devices 440. Secondary storage devices 440 include, for example, hard disk drive 450 and/or removable storage device or drive 460. Removable storage drive 460 represents a magnetic tape drive, a compact disk drive, an optical storage device, tape backup, solid state drive, etc.

Removable storage drive 460 interacts with removable storage unit 470. As will be appreciated, removable storage unit 460 includes a computer usable or readable storage medium having stored therein computer software (control logic) and/or data. Removable storage drive 460 reads from and/or writes to the removable storage unit 470 in a well known manner.

Removable storage unit 470, also called a program storage device or a computer program product, represents a floppy disk, magnetic tape, compact disk, optical storage disk, or any other computer data storage device. Program storage devices or computer program products also include any device in which computer programs can be stored, such as hard drives, ROM or memory cards, etc.

In an embodiment, the present invention is directed to computer program products or program storage devices having software that enables computer 400, or multiple computer 400s to perform any combination of the functions described herein. Computer programs (also called computer control logic) are stored in main memory 430 and/or the secondary storage devices 440. Such computer programs, when executed, direct computer 400 to perform the functions of the present invention as discussed herein. In particular, the computer programs, when executed, enable processor 410 to perform the functions of the present invention. Accordingly, such computer programs represent controllers of the computer 400.

Computer 400 also includes input/output/display devices 480, such as monitors, keyboards, pointing devices, etc. Computer 400 further includes a communication or network interface 490. Network interface 490 enables computer 400 to communicate with remote devices. For example, network interface 490 allows computer 400 to communicate over communication networks, such as LANs, WANs, the Internet, etc. Network interface 490 may interface with remote sites or networks via wired or wireless connections. Computer 400 receives data and/or computer programs via network interface 490.

CONCLUSIONS

The invention can work with software, hardware, and operating system implementations other than those described herein. Any software, hardware, and operating system implementations suitable for performing the functions described herein can be used.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-implemented method, comprising:
   receiving from a calling party by a discrepancy detector a call request having a called telephone number, wherein the call request includes calling party information, wherein the discrepancy detector determines discrepancies in calling party information and is ancillary to an originating service provider network element that provides a telephone line for the calling party placing the call request;
   accessing a monitored called party number database, wherein accessing the monitored called party number database includes determining whether the call request to the called telephone number is to be verified, wherein the monitored called party number database includes telephone numbers;
   when the call request is to be verified, determining by the discrepancy detector whether a discrepancy exists between the calling party information contained within the call request and stored calling party information; and
   when a discrepancy exists between the calling party information contained within the call request and stored calling party information, causing call processing of a call requested in the call request to be suspended.

2. The method of claim 1, further comprising when a discrepancy exists between the calling party information contained within the call request and stored calling party information, generating a discrepancy report.

3. The method of claim 2, further comprising capturing call parameters from the call request.

4. The method of claim 3, wherein the call parameters include one or more of an identity of the originating service provider receiving the call request, Automatic Number Identification information from the call request, caller identification (caller ID) information from the call request, the called party number, a type of discrepancy event, a date of the call request, and/or a time of the call request.

5. The method of claim 2, further comprising transmitting the discrepancy report to a called party or an agent for the called party.

6. The method of claim 5, wherein transmitting the discrepancy report occurs prior to further processing of a call requested in the call request.

7. The method of claim 5, wherein transmitting the discrepancy report occurs during processing of a call requested in the call request and before call completion to the called party.

8. The method of claim 5, wherein transmitting the discrepancy report occurs after call completion to the called party, wherein the discrepancy report is transmitted either individually or in a batch transmission with other discrepancy reports.

9. The method of claim 5, wherein transmitting the discrepancy report comprises transmitting the discrepancy report via the Internet or a virtual private network.

10. The method of claim 2, further comprising causing call processing to be terminated.

11. The method of claim 1, wherein a discrepancy exists when calling party info nation received in a call request does not match stored calling party information assigned by a service provider receiving the call request.

12. The method of claim 1, wherein calling party information includes Automatic Number Identification information or caller identification (caller ID) information.

13. The method of claim 1, wherein the calling party information is included in a Session Initiation Protocol, Integrated Services Digital Network, Plain Old Telephone Service, Time Division Multiplexing, or Voice over Internet Protocol call set up message.

14. The method of claim 1, wherein detecting a discrepancy within the call request is not detectable by the calling party.

15. A computer-implemented method, comprising:
receiving from a calling party by a discrepancy detector a call request having a called telephone number, wherein the call request includes calling party information, wherein the discrepancy detector determines discrepancies in calling party information and is ancillary to an originating service provider network element that provides a telephone line for the calling party placing the call request;
accessing a monitored called party number database, wherein accessing the monitored called party number database includes determining whether the call request to the called telephone number is to be verified, wherein the monitored called party number database includes telephone numbers, wherein the telephone numbers include only telephone numbers and related information for called party numbers for which call request validity is to be assessed;
when the call request is to be verified, determining by the discrepancy detector whether a discrepancy exists between the calling party information contained within the call request and stored calling party information.

16. The method of claim 15, further comprising when a discrepancy exists between the calling party information contained within the call request and stored calling party information, generating a discrepancy report.

17. The method of claim 16, further comprising capturing call parameters from the call request.

18. The method of claim 17, wherein the call parameters include one or more of an identity of the originating service provider receiving the call request, Automatic Number Identification information from the call request, caller identification (caller ID) information from the call request, the called party number, a type of discrepancy event, a date of the call request, and/or a time of the call request.

19. The method of claim 16, further comprising transmitting the discrepancy report to a called party or an agent for the called party.

20. The method of claim 19, wherein transmitting the discrepancy report occurs prior to further processing of a call requested in the call request.

* * * * *